US012794598B2

(12) United States Patent
Buthler et al.

(10) Patent No.: US 12,794,598 B2
(45) Date of Patent: Nov. 10, 2026

(54) DETECTING ABSENCE OF HYBRID AUTOMATIC REPEAT REQUEST FEEDBACK

(71) Applicant: Nokia Technologies Oy, Espoo (FI)

(72) Inventors: Jakob Lindbjerg Buthler, Aalborg (DK); Nuno Manuel Kiilerich Pratas, Aalborg (DK); Renato Barbosa Abreu, Aalborg (DK); Torsten Wildschek, Gloucester (GB); Thomas Haaning Jacobsen, Nørresundby (DK); Laura Luque Sanchez, Málaga (ES)

(73) Assignee: NOKIA TECHNOLOGIES OY, Espoo (FI)

( * ) Notice: Subject to any disclaimer, the term of this patent is extended or adjusted under 35 U.S.C. 154(b) by 278 days.

(21) Appl. No.: 18/623,173

(22) Filed: Apr. 1, 2024

(65) Prior Publication Data

US 2024/0340114 A1 Oct. 10, 2024

(30) Foreign Application Priority Data

Apr. 5, 2023 (FI) .................................... 20235388

(51) Int. Cl.
*H04L 1/1825* (2023.01)
*H04L 1/1812* (2023.01)
*H04W 92/18* (2009.01)

(52) U.S. Cl.
CPC .......... *H04L 1/1825* (2013.01); *H04L 1/1812* (2013.01); *H04W 92/18* (2013.01)

(58) Field of Classification Search
CPC ..... H04L 1/1825; H04L 1/1812; H04W 92/18
See application file for complete search history.

(56) References Cited

U.S. PATENT DOCUMENTS

2016/0359589 A1* 12/2016 Belleschi .............. H04W 24/08
2022/0191725 A1 6/2022 Ashraf et al.
(Continued)

FOREIGN PATENT DOCUMENTS

CN 115150902 A 10/2022
WO 2021/206466 A1 10/2021
(Continued)

OTHER PUBLICATIONS

"Discussion on RAN2 aspects on Sl-U", 3GPP TSG-RAN WG2 Meeting #121, R2-2301719, Agenda: 8.15.2, LG Electronics Inc, Feb. 27-Mar. 3, 2023, pp. 1-8.
(Continued)

*Primary Examiner* — Sun Jong Kim
(74) *Attorney, Agent, or Firm* — Carter, DeLuca & Farrell LLP

(57) ABSTRACT

An apparatus including at least one processor; and at least one memory storing instructions that, when executed by the at least one processor, cause the apparatus at least to perform: detecting absence of a hybrid automatic repeat request, HARQ, feedback for a transmission; determining that the transmission is associated with a sidelink unlicensed band; and based at least on the determining that the transmission is associated with the sidelink unlicensed band, using at least one interpretation rule in determining the detected absence of the HARQ feedback for the transmission either as a positive acknowledgement, ACK, for the transmission or as a negative acknowledgement, NACK, for the transmission.

1 Claim, 7 Drawing Sheets

(56) References Cited

U.S. PATENT DOCUMENTS

| | | | | |
|---|---|---|---|---|
| 2022/0256590 | A1* | 8/2022 | Zhang | H04W 52/288 |
| 2023/0269610 | A1* | 8/2023 | Li | H04L 1/203<br>370/329 |

FOREIGN PATENT DOCUMENTS

| | | | | |
|---|---|---|---|---|
| WO | 2022092894 A1 | 5/2022 | | |
| WO | 2022/126075 A1 | 6/2022 | | |
| WO | 2022/213333 A1 | 10/2022 | | |
| WO | WO-2023014961 A1 * | 2/2023 | | H04W 74/0808 |

OTHER PUBLICATIONS

"5 GHz RLAN; Harmonised Standard covering the essential requirements of article 3.2 of Directive 2014/53/EU", ETSI EN 301 893, V2.1.1, May 2017, pp. 1-122.
"IEEE 802.11", Wikipedia, Retrieved on Sep. 19, 2024 Webpage available at : https://en.wikipedia.org/wiki/IEEE_802.11, 18 pages.
"3rd Generation Partnership Project; Technical Specification Group Services and System Aspects; Architecture enhancements for 5G System (5GS) to support Vehicle-to-Everything (V2X) services (Release 17)", 3GPP TS 23.287, V17.5.0, Dec. 2022, pp. 1-60.
"Msc-generator", Sourceforge, Retrieved on Sep. 19, 2024, Webpage available at : https://sourceforge.net/projects/msc-generator/, 4 pages.
"Discussion on LBT for sidelink operation on unlicensed spectrum", 3GPP TSG-RAN WG2 Meeting #120, R2-2211950, Agenda: 8.15.2, Xiaomi, Nov. 14-18, 2022, 5 pages.
"On channel access priority class and HARQ feedback", 3GPP TSG-RAN WG2 Meeting #119bis Electronic, R2-2210357, Agenda: 8.15.2, Nokia, Nokia Shanghai Bell, Oct. 10-19, 2022, 4 pages.
"On channel access priority class and HARQ feedback", 3GPP TSG-RAN WG2 Meeting #120, R2-2212409, Agenda: 8.15.2, Nokia, Nokia Shanghai Bell, Nov. 14-18, 2022, 4 pages.
"Discussion on LBT for sidelink operation on unlicensed spectrum", 3GPP TSG-RAN WG2 Meeting #119bis electronic, R2-2210380, Agenda: 8.15.2, Xiaomi, Oct. 10-19, 2022, 5 pages.
"3rd Generation Partnership Project; Technical Specification Group Radio Access Network; Physical layer procedures for shared spectrum channel access (Release 17)", 3GPP TS 37.213, V17.4.0, Dec. 2022, pp. 1-39.
"On HARQ, DTX and RLF detection procedures", 3GPP TSG-RAN WG2 Meeting #121bis-e, R2-2302855, Agenda: 7.15.4, Nokia, Nokia Shanghai Bell, Apr. 17-26, 2023, 3 pages.
Extended European Search Report received for corresponding European Patent Application No. 24159258.3, dated Jun. 21, 2024, 8 pages.
Nokia et al. R1-2300036. On Channel Access Mechanism for SL-U. 3GPP TSG RAN WG1 #112, Athens, Greece, Feb. 27-Mar. 3, 2023: [online], Feb. 17, 2023.
Xiaomi. R2-2300840. Discussion on channel access for sidelink operation on unlicensed spectrum. 3GPP TSG-RAN WG2 Meeting #121, Athens, Greece, Feb. 27-Mar. 3, 2023: [online], Feb. 17, 2023.
Finnish Office Action and Search Report issued by the Finnish Patent and Registration Office in relation to Finnish Patent Application No. 20235388 dated Sep. 8, 2023 (13 pages).

* cited by examiner

DETECTING ABSENCE OF HYBRID AUTOMATIC REPEAT REQUEST FEEDBACK

CROSS-REFERENCE TO RELATED APPLICATIONS

This application claims priority to Finnish Patent Application No. 20235388, filed Apr. 5, 2023, the disclosure of this application is expressly incorporated herein by reference in its entirety.

FIELD

Various example embodiments relate to detection of absence of hybrid automatic repeat request (HARQ) feedback for a transmission, such as transmission in sidelink unlicensed band. More specifically, some embodiments relate to interpretation of the detected absence of HARQ feedback.

BACKGROUND

In sidelink (SL) communication, user equipments (UEs) communicate with each other directly. In mode 1, a network node schedules transmission resources for a SL UE. In mode 2, SL UE may autonomously perform the resource selection. When a transmitting UE has transmitted a transmission to a receiving UE, the transmitting UE may wait for a hybrid automatic repeat request (HARQ) feedback from the receiving UE. HARQ feedback indicates whether the receiving UE has successfully received and decoded the transmission. There may be a situation, wherein the transmitting UE does not receive an expected HARQ feedback for the transmission.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to an aspect, there is provided a method, comprising: detecting, by a user equipment, absence of a hybrid automatic repeat request, HARQ, feedback for a transmission; determining that the transmission is associated with a sidelink unlicensed band; and based at least on the determining that the transmission is associated with the sidelink unlicensed band, using at least one interpretation rule in determining the detected absence of the HARQ feedback for the transmission either as a positive acknowledgement, ACK, for the transmission or as a negative acknowledgement, NACK, for the transmission.

The method may be performed by a user equipment, e.g. Tx UE.

According to an embodiment, the at least one interpretation rule is based on at least one of: at least one service-related parameter; or at least one channel-related parameter.

According to an embodiment, the at least one service-related parameter comprises at least one of: —quality of service; —PC5 quality of service indicator; —channel access priority class; —reliability; or —latency.

According to an embodiment, the at least one channel-related parameter comprises at least one of: —reference signal received power; —reference signal received quality; —channel quality indicator; —pathloss; —channel load; or —channel occupancy.

According to an embodiment, the at least one interpretation rule is preconfigured or configured.

According to an embodiment, the method comprises: obtaining configuration for the at least one interpretation rule from a network node or from at least one user equipment.

According to an embodiment, the method comprises: providing, to the network node or to the at least one user equipment, assistance information for determining the configuration for the at least one interpretation rule.

According to an embodiment, the method comprises: determining a configuration for the at least one interpretation rule.

According to an embodiment, the method comprises: obtaining assistance information relating to at least one user equipment for determining the configuration for the at least one interpretation rule; and wherein the determining the configuration for the at least one interpretation rule is based on the obtained assistance information.

According to an embodiment, the assistance information comprises at least one of: —a mapping between at least one transmission characteristic of the transmission and either ACK or NACK; —HARQ feedback history information of the least one user equipment; or —listen before talk, LBT, history information of the at least one user equipment.

According to an embodiment, the at least one interpretation rule is based on a mapping between at least one transmission characteristic of the transmission and either ACK or NACK.

According to an embodiment, the at least one transmission characteristic is at least one of: —quality of service; —PC5 quality of service indicator; —channel access priority class; —reliability; —latency; —reference signal received power; —reference signal received quality; —channel quality indicator; —pathloss; —channel load; or —channel occupancy.

According to an embodiment, the method comprises: determining at least one transmission characteristic of the transmission; and determining, based on the at least one transmission characteristic of the transmission and the mapping, whether to determine the absence of the HARQ feedback as ACK or NACK.

According to an embodiment, the method comprises: determining the detected absence of the HARQ feedback as NACK; and based on the determining the detected absence of the HARQ feedback as NACK, retransmitting the transmission.

According to an aspect, there is provided an apparatus comprising means for performing the method of the aspect above and any of the embodiments thereof. The apparatus may be a user equipment, e.g. Tx UE.

According to an embodiment, the apparatus comprises means for: detecting absence of a hybrid automatic repeat request, HARQ, feedback for a transmission; determining that the transmission is associated with a sidelink unlicensed band; and based at least on the determining that the transmission is associated with the sidelink unlicensed band, using at least one interpretation rule in determining the detected absence of the HARQ feedback for the transmission either as a positive acknowledgement, ACK, for the transmission or as a negative acknowledgement, NACK, for the transmission.

According to an embodiment, the apparatus comprises means for: obtaining configuration for the at least one interpretation rule from a network node or from at least one user equipment.

According to an embodiment, the apparatus comprises means for: providing, to the network node or to the at least one user equipment, assistance information for determining the configuration for the at least one interpretation rule.

According to an embodiment, the apparatus comprises means for: determining a configuration for the at least one interpretation rule.

According to an embodiment, the apparatus comprises means for: obtaining assistance information relating to at least one user equipment for determining the configuration for the at least one interpretation rule; and wherein the determining the configuration for the at least one interpretation rule is based on the obtained assistance information.

According to an embodiment, the apparatus comprises means for: determining at least one transmission characteristic of the transmission; and determining, based on the at least one transmission characteristic of the transmission and the mapping, whether to determine the absence of the HARQ feedback as ACK or NACK.

According to an embodiment, the apparatus comprises means for: determining the detected absence of the HARQ feedback as NACK; and based on the determining the detected absence of the HARQ feedback as NACK, retransmitting the transmission.

According to an embodiment, the means comprises at least one processor; and at least one memory storing instructions that, when executed by the at least one processor, cause the performance of the apparatus. The apparatus may be a user equipment, e.g. Tx UE.

According to an aspect, there is provided a (non-transitory) computer readable medium comprising instructions that when executed by an apparatus, cause the apparatus to perform the method of the aspect above and any of the embodiments thereof. The apparatus may be a user equipment, e.g. Tx UE.

According to an aspect, there is provided a computer program comprising instructions, which, when executed by an apparatus, cause the apparatus to perform the method of the aspect above and any of the embodiments thereof. The apparatus may be a user equipment, e.g. Tx UE.

BRIEF DESCRIPTION OF THE DRAWINGS

Some example embodiments will now be described with reference to the accompanying drawings.

DETAILED DESCRIPTION

Figure 1:
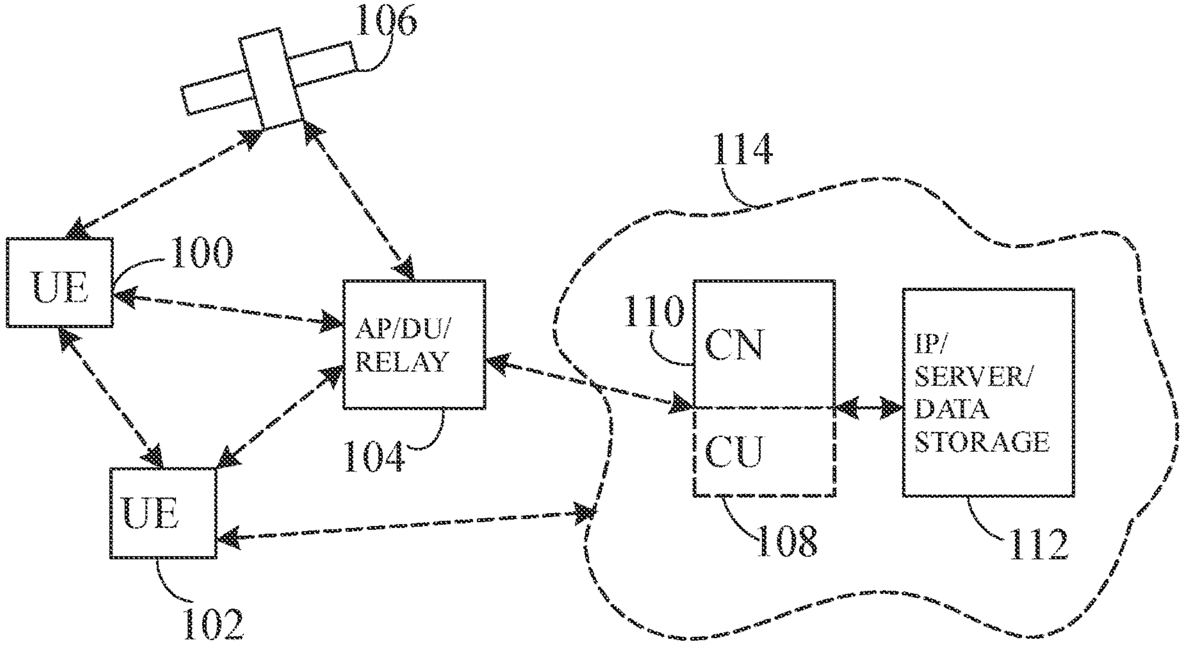
FIG. 1 shows, by way of example, a network architecture of communication system.

FIG. 1 shows, by way of an example, a network architecture of communication system. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The example of FIG. 1 shows a part of an exemplifying radio access network. FIG. 1 shows user devices or user equipments (UEs) 100 and 102 configured to be in a wireless connection on one or more communication channels in a cell with an access node, such as gNB, i.e. next generation NodeB, or eNB, i.e. evolved NodeB (eNodeB), 104 providing the cell. The physical link from a user device to the network node is called uplink (UL) or reverse link and the physical link from the network node to the user device is called downlink (DL) or forward link. It should be appreciated that network nodes or their functionalities may be implemented by using any node, host, server or access point etc. entity suitable for such a usage. A communications system typically comprises more than one network node in which case the network nodes may also be configured to communicate with one another over links, wired or wireless, designed for the purpose. These links may be used for signalling purposes. The network node is a computing device configured to control the radio resources of the communication system it is coupled to. The network node may also be referred to as a base station (BS), an access point or any other type of interfacing device including a relay station capable of operating in a wireless environment. The network node includes or is coupled to transceivers. From the transceivers of the network node, a connection is provided to an antenna unit that establishes bi-directional radio links to user devices. The antenna unit may comprise a plurality of antennas or antenna elements. The network node is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. An example of the network node configured to operate as a relay station is integrated access and backhaul node (IAB). The distributed unit (DU) part of the IAB node performs BS functionalities of the IAB node, while the backhaul connection is carried out by the mobile termination (MT) part of the IAB node. UE functionalities may be carried out by IAB MT, and BS functionalities may be carried out by IAB DU. Network architecture may comprise a parent node, i.e. IAB donor, which may have wired connection with the CN, and wireless connection with the IAB MT.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

Additionally, although the apparatuses have been depicted as single entities, different units, processors and/or memory units (not all shown in FIG. 1) may be implemented inside these apparatuses, to enable the functioning thereof.

5G enables using multiple input-multiple output (MIMO) technology at both UE and gNB side, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 7 GHz, cmWave and mmWave, and also being integratable with existing legacy radio access technologies, such as the LTE. Below 7 GHz frequency range may be called as FR1, and above 24 GHZ (or more exactly 24-52.6 GHZ) as FR2, respectively. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 7 GHZ-cmWave, below 7 GHZ cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano) satellites are deployed). Each satellite 106 in the constellation may cover several satellite-enabled network entities that create on-ground cells. The on-ground cells may be created through an on-ground relay node 104 or by a gNB located on-ground or in a satellite.

In sidelink communication, the UEs, e.g. UE 100 and UE 102 of FIG. 1, may communicate with each other without involvement of a network node 104. In sub-7 GHZ unlicensed bands, for example, the new radio (NR) coexistence with other systems, such as IEEE 802.11, is ensured via a listen before talk (LBT) channel access mechanism. A user equipment (UE) intending to perform a sidelink (SL) transmission needs first to successfully complete an LBT check to acquire channel access, or channel occupancy time (COT).

The UE may perform the LBT check by observing the channel availability in clear channel assessment (CCA) slots. To pass the LBT check, the channel should be observed as available in consecutive CCA slots (in predefined number of consecutive slots). For example, in sub-7 GHz bands the duration of these slots is 9 μs. The UE deems the channel as available in a CCA slot if the measured power, or the collected energy during the CCA slot, is below a regulatory specified threshold, which may depend on the operating band and a current geographical region.

When a UE initiates the communication, or the UE takes the role of initiating device, the UE may acquire the right to access the channel for a certain period of time, which may be referred to as a channel occupancy time (COT). To acquire the access for the channel for duration of the COT, the UE may apply an LBT procedure, which may be referred to as an extended LBT or LBT type 1. In LBT type 1, the aim is to deem the channel as free for the entire duration of the backoff procedure determined by a contention window (CW).

The duration of the COT and CW depends on a channel access priority class (CAPC) associated with the UE's traffic. The associations between the CAPC, CW and COT for uplink (UL) have been defined in 3rd generation partnership project (3GPP) TS 37.213, version 17.4.0, Table 4.2.1-1. For example, the associations between the CAPC, CW and COT defined for UL may be used in SL as well. As another example, associations between the CAPC, CW and COT defined for downlink (DL) may be used in SL.

The UE (initiating device) may initiate and perform the transmission after successfully completing the LBT Type 1. The UE has acquired the COT with duration associated with the corresponding CAPC. The acquired COT is valid even in the case where the initiating device pauses its transmission. However, if the initiating device will perform a new transmission within the COT, it may be required to perform another LBT procedure, which may be referred to as a reduced LBT procedure or LBT type 2. The LBT type 2 has different variants for different situations depending on a gap between two consecutive SL transmissions. The two transmissions may be both transmitted by the initiating device, or the two transmissions may be transmitted by different UEs such that the first transmission is transmitted by the initiating device to a responding device and the second transmission is transmitted by the responding device to the initiating device. The two transmissions may be transmitted within the COT acquired by the initiating device.

An example of LBT type 2 is Type 2A (25 μs LBT): If the gap between two SL transmissions is >25 μs, the UE may transmit the SL transmission (immediately) after sensing the channel to be idle (or free or unoccupied) for at least a sensing interval of 25 μs.

An example of LBT type 2 is Type 2B (16 μs LBT): If the gap between two SL transmissions is exactly equal to 16, the UE may transmit the SL transmission (immediately) after sensing the channel to be idle (or free or unoccupied) for at least a sensing interval of 16 μs.

An example of LBT type 2 is Type 2C (no LBT): If the gap between two SL transmissions <16 μs, the UE may transmit the SL transmission without performing LBT. Maximum duration of the COT may be 584 μs.

The initiating device may share its acquired COT with its intended receiver (the responding device). For this purpose, the initiating device may inform, for example via control signaling, the responding device about the duration of this COT. The responding device may use this information to decide which type of LBT it should apply upon performing a transmission for which the intended receiver is the initiating device. In case the transmission from the responding device falls outside the COT acquired by the initiating device, the responding device will have to acquire a new COT using the LBT Type 1 with the appropriate CAPC.

When a transmitting UE, e.g. Tx UE, has transmitted the transmission to a receiving UE, e.g. Rx UE, the Tx UE may expect to receive hybrid automatic repeat request (HARQ) feedback from the Rx UE. In other words, Tx UE may initiate reception of HARQ feedback from Rx UE (i.e. from the target to which the transmission is transmitted). HARQ feedback or HARQ message indicates success or failure of decoding of the transmission at the receiving UE. It is noted that the transmission may be one-to-one (unicast transmission) targeted to single receiving UE or one-to-many transmission (multicast or broadcast) targeted to a plurality of receiving UEs. In the latter case, Tx UE may initiate reception of HARQ feedback from one Rx UE representing the whole group of Rx UEs (i.e. said plurality of receiving UEs) or from more than one (e.g. each of the plurality of Rx UEs) Rx UE. Thus, Tx UE may initiate reception of HARQ feedback from one or more receiving UEs depending on the targeted receiving UE(s). It is noted that initiating reception of HARQ feedback may mean that Tx UE listens to HARQ transmission(s) from the receiving UE(s). However, HARQ feedback may or may not be received due to various reason(s).

Successful decoding at the receiving UE (e.g. Rx UE) is indicated via positive HARQ feedback, acknowledge (ACK). Failed decoding is indicated via negative HARQ feedback, not acknowledge (NACK). After receiving NACK from the receiving UE, the transmitting UE may re-transmit the transmission.

It may happen that the transmitting UE does not receive the HARQ feedback. For example, a missing HARQ feedback may be due to failed reception of data transmitted from the transmitting UE (Tx UE) to the receiving UE (Rx UE). The Rx UE may have been unable to receive the data due to half duplex issue or bad signal quality or obstruction in line of sight (LoS), for example. As another example, the Rx UE may have transmitted the HARQ feedback, but the Tx UE may be unable to receive it. As a further example, the Rx UE may be unable to transmit the HARQ feedback due to LBT failure at the Rx UE.

In sidelink, HARQ feedback may be transmitted on pre-assigned resource or pre-assigned resources, physical sidelink feedback channel (PSFCH). The transmitting UE may detect an absence of the HARQ feedback based on detecting that the HARQ feedback is not received on the resources assigned for the HARQ feedback. For example, a time period may be defined during which the HARQ feedback should be received. If the time period is passed without receiving HARQ feedback, the transmitting UE may determine absence of the HARQ feedback for a transmission the transmitting UE has transmitted earlier e.g. in sidelink unlicensed band. The transmitting UE may have transmitted the transmission to at least one UE. For example, the Tx UE may have transmitted the transmission to a group of UEs, e.g. group of Rx UEs. Thus, the transmitting UE (e.g. Tx UE) may have transmitted the transmission to Rx UE and/or one or more other UEs.

In case the transmitting UE does not receive the HARQ feedback, the transmitting UE might not know whether the Rx UE has successfully decoded the transmission. The UE may thereby attempt to retransmit the transmission, if the maximum number of retransmissions has not been reached. Lack or absence of HARQ feedback may also impact the discontinuous transmission (DTX) counter, which is used to control the SL radio link failure (RLF).

A method and an apparatus configured to perform the method are provided for enabling the apparatus to interpret a missing HARQ feedback. The apparatus may be a Tx UE configured to communicate with at least one Rx UE. For example, the apparatus may be configured to communicate with the at least one Rx UE via sidelink unlicensed (SL-U) band.

Figure 2:
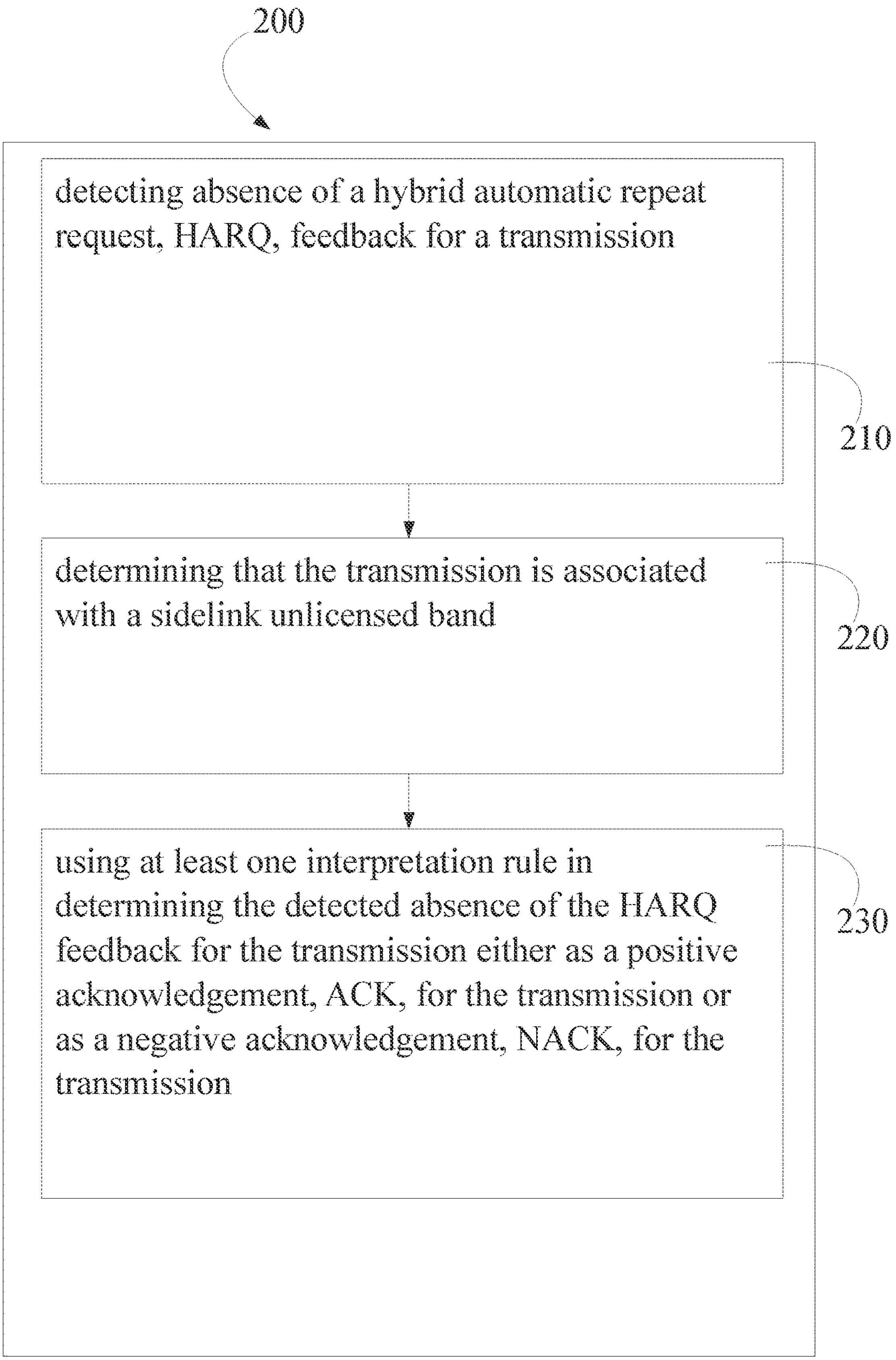
FIG. 2 shows, by way of example, a flowchart of a method.

FIG. 2 shows, by way of example, a flowchart of a method 200. The phases of the illustrated method may be performed by a UE, or by a control device configured to control the functioning thereof, when installed therein. The UE may be, for example, the device 310 of FIG. 3, which is configured to perform at least the method 200. The method 200 comprises detecting 210 absence of a hybrid automatic repeat request, HARQ, feedback for a transmission. The method 200 comprises determining 220 that the transmission is associated with a sidelink unlicensed band. The method 200 comprises using 230 at least one interpretation rule in determining the detected absence of the HARQ feedback for the transmission either as a positive acknowledgement, ACK, for the transmission or as a negative acknowledgement, NACK, for the transmission. Step 230 may be performed based at least on the determining that the transmission is associated with the sidelink unlicensed band and/or based on detecting the absence of HARQ feedback.

The method as disclosed herein enables a user equipment to interpret absence of HARQ feedback effectively, and avoiding or at least reducing unnecessary retransmissions.

According to an alternative aspect to the method 200, the UE may skip step 220 (i.e., the determining that the transmission is associated with SL-U band). Thus, step 220 may not be mandatory for all embodiments disclosed herein. For example, the detected absence of HARQ feedback in step 210 may be implicitly associated with SL-U band and thus such explicit determination of step 220 may not be needed. Thus, also in this case the transmission may be associated with SL-U even if the explicit determination of step 220 would not be performed. Another example is that the UE may apply similar logic for all types of transmissions or at least some other type of transmission (than SL-U transmission) for which HARQ feedback is not detected. In case step 220 is not performed, the method step 230 may be performed based on detected absence of HARQ feedback for the given transmission(s) (e.g. based on step 210).

Figure 3:
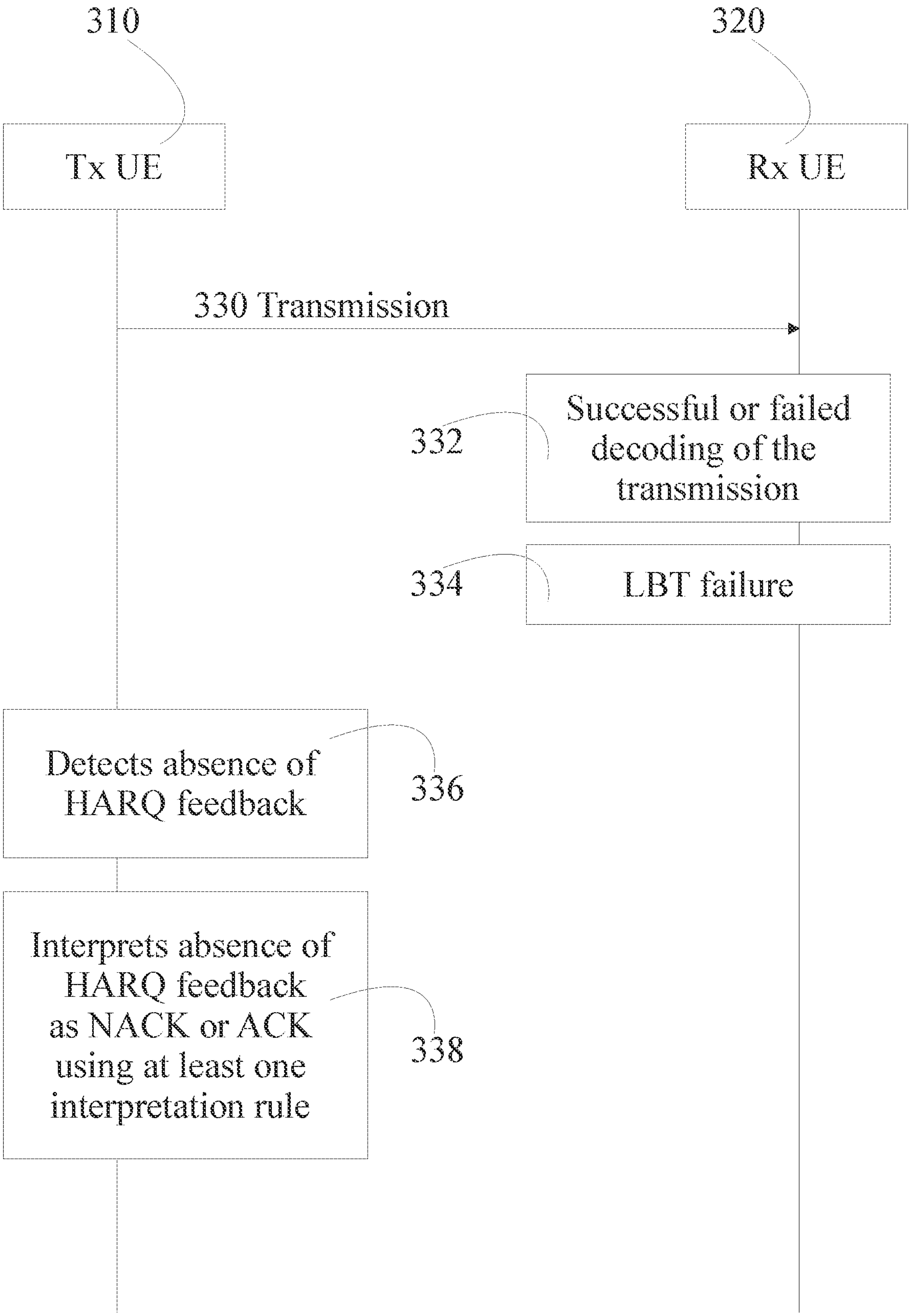
FIG. 3 shows, by way of example, signalling between entities.

FIG. 3 shows, by way of example, signalling between entities. A Tx UE 310 is configured to communicate with at least one Rx UE 320 in SL-U band. The Tx UE 310 may perform an LBT procedure. After successful LBT, the Tx UE 310 may access a channel and transmit a transmission 330 to the Rx UE 320 or to a plurality of Rx UEs. LBT procedure before the transmission 330 may be beneficial, but it could potentially be neglected (i.e. not performed) in some example embodiments. That is, Tx UE 330 may perform the transmission without LBT, but LBT should be preferred to reduce possible problems caused by radio interference.

The Rx UE 320 may receive the transmission 330 from the Tx UE 310. In some occasions, the Rx UE might not be able to receive the transmission, e.g. due to half duplex issue or bad signal quality, for example. Thus, the Rx UE 320 may try to receive the transmission from the Tx UE 310 with given resource(s).

Let us consider that the Rx UE 320 receives the transmission and tries to decode the transmission. Rx UE 320 performs 332 either successful or failed decoding of the transmission. The Rx UE may be configured to send ACK to the Tx UE after successful decoding. The Rx UE may be configured to send NACK to the Tx UE after failed or unsuccessful decoding, so that the Tx UE may re-transmit the transmission.

The Rx UE 320 may initiate LBT procedure for transmission of the HARQ feedback (i.e. ACK or NACK). For example, the LBT may fail and result to LBT failure 334. Thus, the Rx UE 320 might not be able to transmit the HARQ feedback to the Tx UE 320. Alternatively, as described in the context of FIG. 5 and FIG. 6, the Rx UE 320 may decide not to transmit the HARQ feedback.

As another example, the Rx UE 320 may successfully perform the LBT and initiate transmission of the HARQ feedback to the Tx UE 310. However, Tx UE 310 may fail to receive the HARQ feedback, e.g. due to half duplex issue or due to bad signal quality.

Tx UE 310 detects 336 absence of HARQ feedback for the transmission 330. Detection of the absence of HARQ feedback on pre-assigned resources may be performed as described above.

The Tx UE 310 may determine that the transmission 330, for which the HARQ feedback has not been received, is associated with a SL-U band, or determine that the absence of HARQ feedback is related to the transmission or resource pool or resource block (RB) set within SL-U band.

Based on the determining that the transmission is associated with the SL-U band or that the absence of HARQ feedback is related to the transmission or resource pool or RB set within SL-U band, and using at least one interpretation rule, the Tx UE 310 determines 338 the detected absence of the HARQ feedback for the transmission 330 either as ACK or NACK.

Alternatively, the Tx UE 310 may determine, based on the at least one interpretation rule without determining that the transmission is associated with SL-U band, the detected absence of the HARQ feedback for the transmission 330 either as ACK or NACK.

Determining the absence of HARQ feedback either as ACK or NACK means that the Tx UE 310 may be able to determine absence of HARQ feedback not only as ACK (always as ACK) and not only as NACK (always as NACK), but one of ACK or NACK depending on the interpretation rule(s). So, the Tx UE 310 may not always have to interpret the absence as ACK or NACK, but Tx UE 310 may be configured to do the interpretation based on the interpretation rule. This may make the interpretation more flexible and allow, for example, the interpretation to be transmission specific (i.e. different for different service levels). Below some examples of the flexible interpretation schema are discussed.

For example, the at least one interpretation rule may be based on at least one service-related parameter. Service-related parameter comprises at least one of: quality of service (QOS), PC5 quality of service indicator (PQI), channel access priority class (CAPC), reliability or latency.

As another example, the at least one interpretation rule may be based on at least one channel-related parameter. Channel related parameter comprises at least one of: reference signal received power (RSRP), reference signal received quality (RSRQ), channel quality indicator (CQI), pathloss, channel load or channel occupancy.

Tx UE 310 and Rx UE 320 are both aware of the service-related parameters and the channel-related parameters.

The at least one interpretation rule may be preconfigured or configured.

Pre-configuration may be performed, for example, via a mapping table. The at least one interpretation rule may be based on a mapping between at least one transmission characteristic of the transmission and either ACK or NACK. The transmission characteristic may be at least one of: quality of service (Qos), PC5 quality of service indicator (PQI), channel access priority class (CAPC), reliability, latency, reference signal received power (RSRP), reference signal received quality (RSRQ), channel quality indicator (CQI), pathloss, channel load or channel occupancy.

Tx UE 310 and Rx UE 320 may both be aware of the transmission characteristic(s).

For example, the mapping table may be indicative of a correspondence between a PQI value and interpretation of a missing HARQ feedback or absence of HARQ feedback. For example, the mapping table may comprise the following mapping: PQI 21-NACK; PQI 22-ACK; PQI 23-NACK; PQI 55-NACK; PQI 56-ACK; PQI 57-ACK; PQI 58-ACK; PQI 59-ACK; PQI 90-NACK; PQI 91-NACK. Thus, for example, the UE may determine PQI value associated with the transmission 330 and determine associated interpretation of absence of HARQ feedback for the transmission 330. For example, if the transmission has or is associated with PQI value of 23, absence of HARQ feedback may be interpreted as NACK according to the example mapping given above.

The mapping table may alternatively or in addition provide correspondence between QoS value and interpretation of a missing HARQ feedback or absence of HARQ feedback. For example, the transmission 330 may have certain QoS and that QoS may be associated with ACK or NACK similarly as described above with reference to using PQI values.

The mapping table may alternatively or in addition provide correspondence between CAPC value and interpretation of a missing HARQ feedback or absence of HARQ feedback. For example, the transmission 330 may belong to a certain CAPC, and that CAPC may be associated with ACK or NACK similarly as described above with reference to using PQI values or QoS values.

The mapping table may alternatively or in addition provide correspondence between reliability value or latency value and interpretation of a missing HARQ feedback or absence of HARQ feedback.

For example, Tx UE 310 may determine at least one transmission characteristic of the transmission, e.g. PQI. The Tx UE may determine, based on the PQI and the mapping between the PQI and the interpretation of the HARQ feedback, whether to determine the absence of the HARQ feedback as ACK or NACK.

In case the service has a PQI, which does not require high reliability, the Tx UE 310 may determine the absence of the HARQ feedback as ACK. Thus, the Tx UE will not retransmit the transmission 330.

In case the service has a PQI, which requires high reliability, the Tx UE 310 may determine the absence of the HARQ feedback NACK. Thus, the Tx UE 310 may retransmit the transmission. The transmission may be retransmitted to the UE, whose HARQ feedback has not been detected by the Tx UE.

As another example, the mapping table may be indicative of a correspondence between CAPC and interpretation of a missing HARQ feedback or absence of HARQ feedback. Agreed correspondence exists between PQI and CAPC. CAPC applied by the Tx UE 310 for its transmission 330 may be the transmission characteristic based on which the interpretation of the absence of the HARQ feedback may be performed.

For example, for CAPC 1, which indicates the highest priority, the associated COT is short. Therefore, the PSFCH resource(s) the Rx UE 320 will use to provide its HARQ feedback may be outside of the COT acquired by the Tx UE 310. Thus, the Rx UE 320 may need to apply LBT type 1 to access the PSFCH resource(s) for transmission of the HARQ feedback. In this case, LBT failure may be a probable cause of the Rx UE 320 not being able to transmit the HARQ feedback. Thus, the Tx UE 310 may determine the absence of the HARQ feedback as ACK. Mapping between CAPC and the interpretation of the absence of the HARQ feedback would in this case be: CAPC 1-ACK.

As another example, for CAPC 4, which indicates the lowest priority, the associated COT is long. Therefore, the PSFCH resource(s) the Rx UE 320 will use to provide its HARQ feedback are likely to be inside of the COT acquired by the Tx UE 310. Thus, the Rx UE 320 may apply LBT type 2 to access the PSFCH resource(s) for transmission of the HARQ feedback. In this case, the Tx UE 310 may determine the absence of the HARQ feedback as NACK. Mapping between CAPC and the interpretation of the absence of the HARQ feedback would in this case be: CAPC 4-NACK.

Mapping between transmission characteristic and ACK/NACK may be performed in various ways. One example to provide the mapping is to use the mapping table which may be pre-configured (e.g. specified in one or more specifications) or configured (determined by the Tx UE 310 or received from some other network entity). Use of mapping table may not be necessary in the sense that it may suffice to use any means to provide the described mapping to the relevant UE(s) performing the interpretation on absence of HARQ feedback. Thus, the mapping table could simply be referred to as mapping in at least some examples.

Regarding the mapping, for example, specific values of PQI may be explicitly mapped either as NACK or NACK. Alternatively, a range or a threshold value may be defined such that PQI values larger than the threshold may be interpreted as ACK, and the PQI values lower than the threshold may be interpreted as NACK. Thus, the mapping between transmission characteristic, such as PQI, may be explicit value to ACK/NACK interpretation or range to ACK/NACK interpretation to name couple of examples. In essence, the at least one interpretation rule may provide mapping between transmission characteristic and ACK/NACK interpretation for a transmission for which absence of HARQ feedback was detected.

Regarding the mapping based on the channel load transmission characteristic, it may be determined that when the channel load is low (below some threshold), a potential unnecessary retransmission is less of a problem than when the channel load is high. For example, the Tx UE may interpret or determine the absence of HARQ feedback as ACK, if the channel load is high, e.g. above a channel busy ratio (CBR) threshold, and the Tx UE may interpret or determine the absence of HARQ feedback as NACK, if the channel load is low, e.g. below the CBR threshold.

Regarding the mapping based on SL RSRP, the Tx UE may use the RSRP measured by the Tx UE for an earlier transmission of the current Rx UE, for example. Alternatively or additionally, the Tx UE may use the RSRP earlier measured and reported by the Rx UE for transmission(s) from the Tx UE. To estimate the RSRP at the Rx UE(s), the Tx UE may use estimated sidelink pathloss and the transmission power of the current transmission 330. Tx UE 310 may estimate the sidelink pathloss for sidelink pathloss based power control in unicast. If the estimated RSRP level is above a threshold, the Tx UE may determine the absence of HARQ feedback as ACK, as the likelihood of successful reception and decoding of the transmission 330 is high. If the estimated RSRP level is below a threshold, the Tx UE may determine the absence of HARQ feedback as NACK, as the likelihood of successful reception and decoding of the transmission 330 is low.

Transmission characteristics may be combined for determination of the HARQ feedback either as NACK or ACK. For example, RSRP level mapping may be combined with PQI value mapping. For example, if the PQI is of a certain value or in certain range, and the RSRP level is of a certain value or in certain range, the absence of HARQ feedback may be determined by the Tx UE as ACK. Otherwise, the Tx UE may determine the absence of HARQ feedback as NACK.

As an alternative to pre-configuration, the at least one interpretation rule may be configured by a network node or another UE. Tx UE may receive configuration for the at least one interpretation rule from a network node or from at least one Rx UE. For example, in the example of FIG. 3, the configuration may be received from Rx UE 320 or from some network node. The configuration may be received via radio resource control (RRC) signalling, medium access control (MAC) control element (CE) or downlink control information (DCI), for example.

Tx UE may provide, to the network node or to the at least one Rx UE, assistance information for determining the configuration for the at least one interpretation rule. The assistance information may comprise, for example, transmission characteristic(s).

In some example, Tx UE may determine the configuration for the at least one interpretation rule itself. For determination, the Tx UE may receive assistance information from at least one Rx UE. Examples of the assistant information are given in the context of FIG. 4. For example, the assistant information may comprise statistics of transmitted NACKs and/or ACKs, experienced discontinuous transmission (DTX), identities used in unicast, group membership information, and/or mapping table indicative of mapping between at least one transmission characteristic and ACK/NACK.

Figure 4:
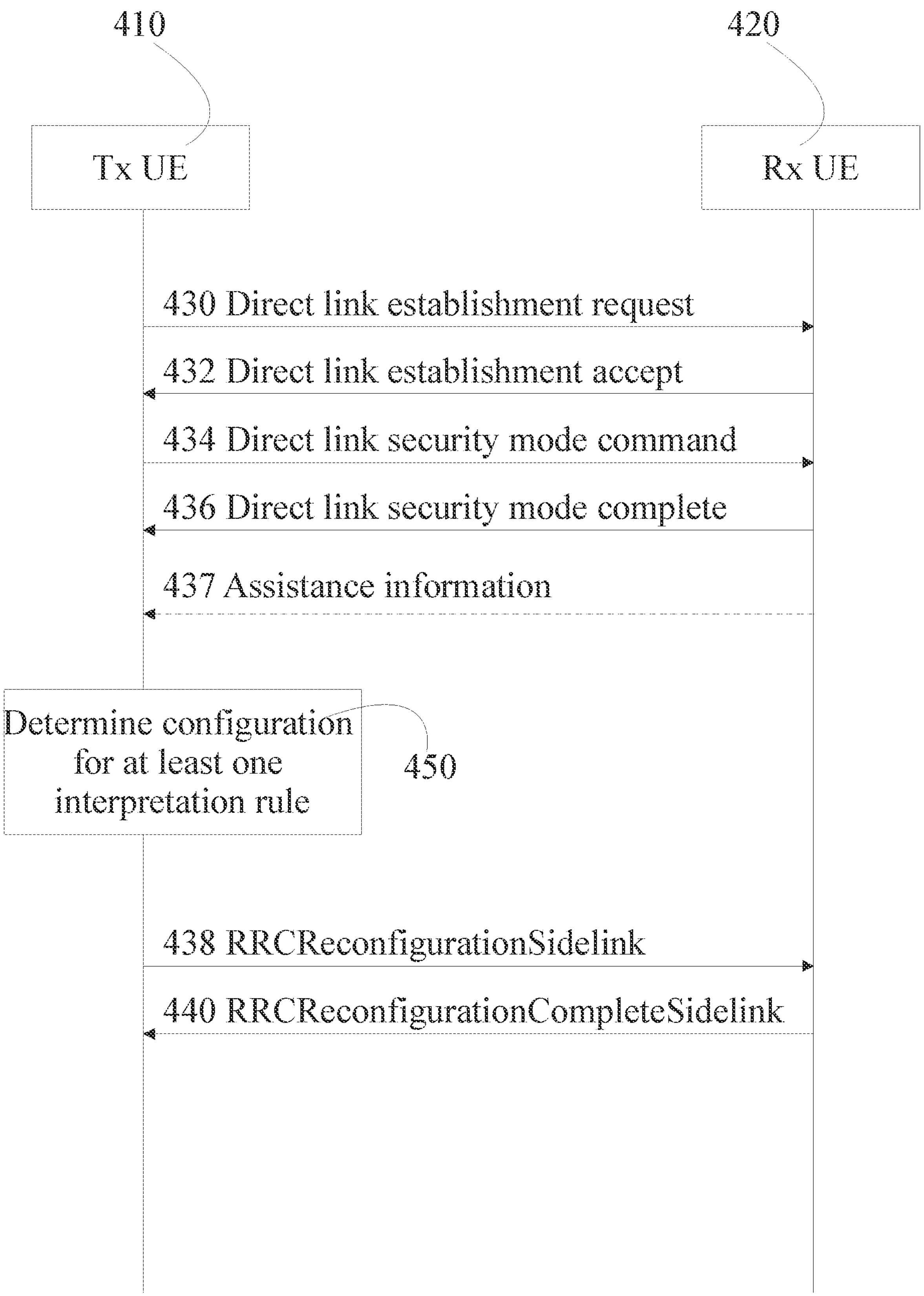
FIG. 4 shows, by way of example, signalling between entities.

FIG. 4 shows, by way of example, signalling between entities. Tx UE 410 an Rx UE 420 may perform the direct link establishment 430, 432 and set up the direct link security services 434, 436. The Tx UE and Rx UE may agree on how the Tx UE will determine a possible absence of HARQ feedback. This negotiation may be performed, for example, through RRCReconfigurationSidelink signalling 438, 440. For example, the Tx UE may transmit 438 reconfiguration to the Rx UE, wherein the reconfiguration includes negotiation of behaviour in a situation wherein the Tx UE detects absence of HARQ feedback from Rx UE. The Rx UE may transmit 440 confirmation for the negotiation.

The Rx UE 420 may provide assistance information 437 to the Tx UE 410 for determining the configuration for the at least one interpretation rule. For example, Rx UE may provide information on LBT failures and/or successful LBTs in history, or statistics of transmitted NACKs/ACKs or experienced discontinuous transmission (DTX). Some Rx UEs may be exposed to higher interference than other UEs. Some Rx UEs in a group of Rx UEs may respond with NACK more often than other group members. Rx UE may report the statistics of transmitted NACKs/ACKs as assistance information to the Tx UE.

Assistance information may be provided upon connection setup. Alternatively, the assistance information may be provided in a recurrent manner, e.g. after updating the statistics of LBT history and/or HARQ feedback history.

Tx UE may determine 450 the configuration for the at least one interpretation rule based on the obtained assistance information. For example, an Rx UE may provide assistance information comprising HARQ feedback history information. For example, the received HARQ feedback history information may indicate that the Rx UE almost always responds with NACK. Then, the Tx UE may determine or choose to interpret detected absence of HARQ feedback from that specific Rx UE as NACK. As another example, the received HARQ feedback history information may indicate that the Rx UE almost always responds with ACK. Then, the Tx UE may determine or choose to interpret detected absence of HARQ feedback from that specific Rx UE as ACK.

As another example, assistance information may comprise LBT history information. LBT history information may indicate statistics of successful and/or failed LBTs of the Rx UE or the device providing the assistance information. Tx UE may determine, based on the assistance information comprising LBT history information, how likely it is that a specific Rx UE will fail its LBT. An interpretation rule may be defined based on received assistance information. According to the interpretation rule, detected absence of HARQ feedback from a specific Rx UE is interpreted as ACK, if probability of LBTs is high; and as NACK, if probability of LBTs is low.

LBT history information and/or HARQ feedback history information of a plurality of Rx UEs may be collected by a device, such as network node, which may then transmit the assistance information relating to the plurality of Rx UEs to the Tx UE. The Tx UE may obtain assistance information relating to at least one UE for determining the configuration for the at least one interpretation rule. The Tx UE may obtain the assistance information relating to at least one UE from at least one Rx UE or from a network node, for example.

Assistance information provided by Rx UE may comprise its identities used in unicast and its group membership information. The Rx UE may perform multiple HARQ feedback transmissions on the same resource or PSFCH occasion. If Rx UE experiences LBT failure, it will result in dropping all of the HARQ feedback transmissions. If, however, the Rx UE is able to perform some of the HARQ feedback transmissions, but not all, then it may be inferred that LBT failure is not the cause of the missing HARQ feedback transmissions. As the Tx UE has been provided with assistance information indicative of the Rx UE identities used in unicast and its group membership information, the Tx UE may monitor physical sidelink shared channel (PSSCH) transmissions from other UEs to the Rx UE, and whether the other UEs request HARQ feedback on the same PSFCH occasions. Thus, the Tx UE is aware of expected HARQ feedback transmissions from Rx UE to other UEs on the same PSFCH occasions on which Tx UE itself expects for HARQ feedback. If Tx UE detects HARQ feedback transmissions from Rx UE to other UEs, and detects absence of HARQ feedback for transmission, which is associated with a transmission from Tx UE to Rx UE in SL-U band, the Tx UE may determine that the absence of HARQ feedback is not due to LBT failure, and that it is likely that Rx UE has not received the transmission. Then, the Tx UE may determine that the absence of HARQ feedback may be interpreted as NACK, and the Tx UE may retransmit the transmission.

The assistance information 437 may comprise the mapping between at least one transmission characteristic of the transmission and either ACK or NACK. The mapping may be provided in form of a mapping table, for example.

In groupcast, the Tx UE transmits to a group of Rx UEs with a single transport block (TB) and sidelink control information (SCI). Depending on the group size, the Tx UE may decide whether to use groupcast feedback option 1 or option 2. In option 1, HARQ feedback is transmitted only when it's NACK. In option 2, either HARQ ACK or HARQ NACK is transmitted as HARQ feedback.

Even if option 1 would be decided based on the group size, the Tx UE may determine the absence of HARQ feedback based on the at least one interpretation rule if it is preconfigured or configured. Thus, the option 1 may be replaced by the preconfigured or configured interpretation rule.

In option 2, the Tx UE may determine the absence of HARQ feedback based on the at least one interpretation rule, wherein the rule is preconfigured or configured.

The Tx UE may detect absence of HARQ feedback from one group member, while having received HARQ feedback from other group members located close to the one group member. Based on this, the Tx UE may determine that it is unlikely that the one group member has failed LBT. Thus, it may determine that the one group member has not received the transmission which the Tx UE has groupcasted in SL-U band.

The Rx UE may be aware of how the Tx UE will interpret the absence of HARQ feedback. In other words, the Rx UE knows the interpretation rule(s) the Tx UE applies for detected absence of HARQ feedback. The Rx UE may use this knowledge and determine to skip transmission of the HARQ feedback to the Tx UE, if Rx UE determines that the Tx UE will determine the absence of the HARQ feedback correctly as ACK or NACK.

For example, interpretation rule may be based on a mapping between PQI and ACK/NACK. The Rx UE may successfully decode a received transmission and be configured to transmit ACK. If the current PQI maps to ACK, the Rx UE may skip the transmission of the ACK, or refrain from transmitting the HARQ feedback.

As another example, the Rx UE may fail in decoding of the received transmission and be configured to transmit NACK. If the current PQI maps to NACK, the Rx UE may skip the transmission of the HARQ feedback.

The method as disclosed herein enables a user equipment, e.g. Tx UE, to interpret absence of HARQ feedback properly, and avoid unnecessary retransmissions. In addition, it enables unnecessary transmission of the HARQ feedback by Rx UE in situations wherein the Rx UE determines that the Tx UE will correctly interpret the absence of HARQ feedback. The methods as disclosed herein enable resource savings.

Figure 5:
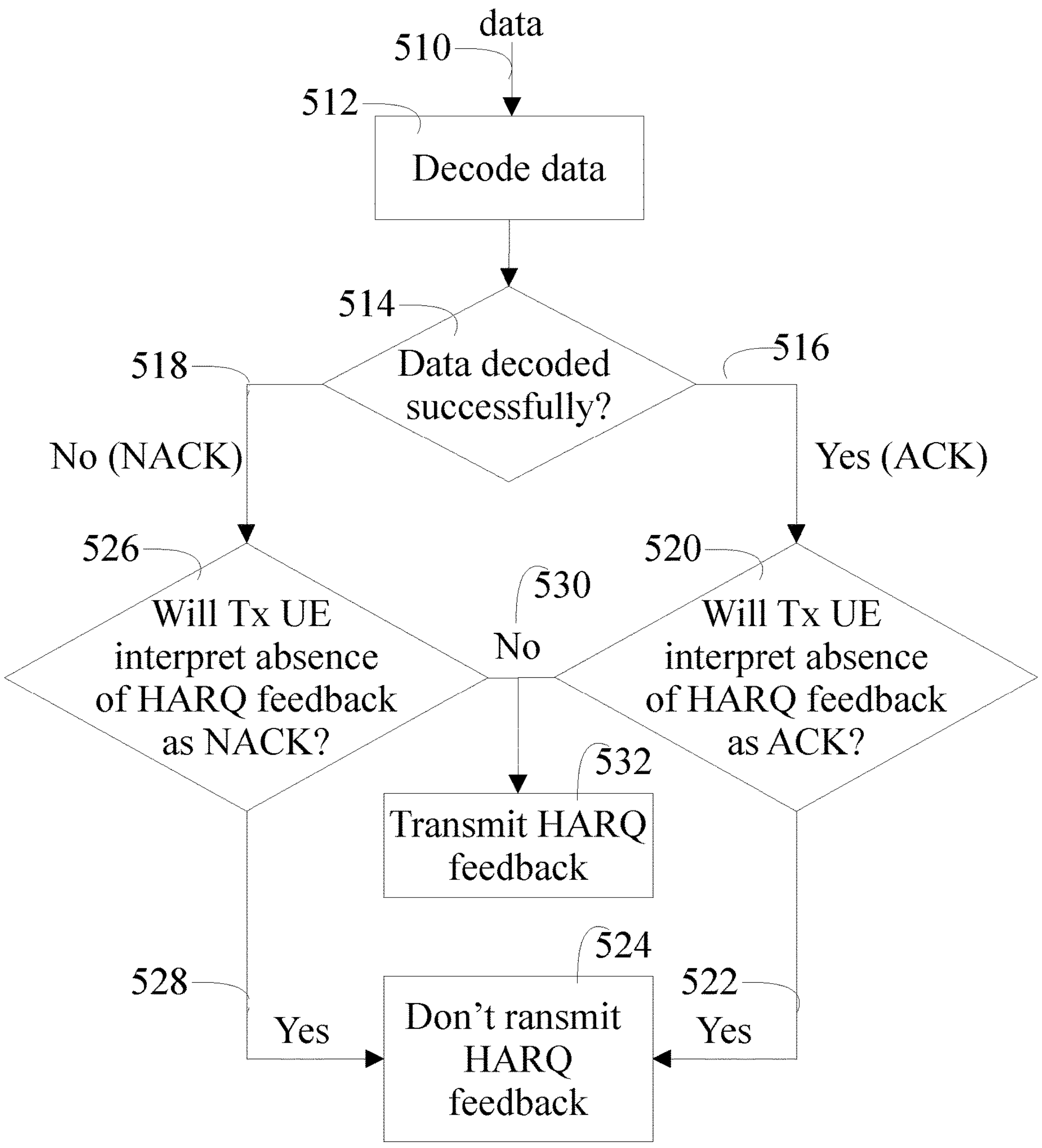
FIG. 5 shows, by way of example, a flowchart of a method.

FIG. 5 shows, by way of example, a flowchart of a method. The method may be performed by a UE, e.g. Rx UE, or by a control device configured to control the functioning thereof, when installed therein. The Rx UE may be configured or preconfigured with at least one interpretation rule, which the Tx UE will use in determining a detected absence of the HARQ feedback as ACK or NACK. The Rx UE may be configured or preconfigured to determine at least based on the at least one interpretation rule, whether to send HARQ feedback.

The Rx UE may receive 510, from a user equipment, e.g. Tx UE, a transmission via sidelink unlicensed band. The Rs UE may determine HARQ feedback for the transmission. The Rx UE may decode 512, or at least attempt to decode, the received transmission (data). The Rx UE may determine 514 whether the decoding was successful or not. The Rx UE may determine a decoding result for the transmission. If decoding was successful, the decoding result is positive. If decoding was not successful, the decoding result is negative. Based on determining, whether decoding was successful, the Rx UE may determine HARQ feedback for the transmission. If decoding was successful 516, Rx UE determines HARQ feedback as ACK. If decoding was not successful 518, Rx UE determines HARQ feedback as NACK.

Rx UE may determine, based on at least one interpretation rule, whether Tx UE interprets a detected absence of HARQ feedback correctly. In other words, Rx UE may determine an interpretation result of a detected absence of HARQ feedback based on at least one interpretation rule. Based on the decoding result and the interpretation result, Rx UE determines whether to send the HARQ feedback for the transmission. The at least one interpretation rule is used by Tx UE in determining a detected absence of HARQ feedback for the transmission either as ACK for the transmission or as NACK for the transmission.

For example, in case the decoding result is positive, and HARQ feedback would comprise ACK, the Rx UE may determine 520, based on at least one interpretation rule, will Tx UE interpret a detected absence of HARQ feedback correctly as ACK. In other words, the Rx UE determines that the decoding result corresponds to the interpretation result, or determines a match or a correct correspondence between the decoding result and the interpretation result. If Tx UE will interpret the detected absence of HARQ feedback correctly 522, the Rx UE may determine to skip 524 transmission of the HARQ feedback for the transmission. In other words, the Rx UE may refrain from transmitting the HARQ feedback for the transmission.

For example, in case the decoding result is negative, and HARQ feedback would comprise NACK, the Rx UE may determine 526, will Tx UE interpret a detected absence of HARQ feedback correctly as NACK. In other words, the Rx UE determines that the decoding result corresponds to the interpretation result, or determines a match or a correct correspondence between the decoding result and the interpretation result. If Tx UE will interpret the detected absence of HARQ feedback correctly 528, the Rx UE may determine to skip 524 transmission of the HARQ feedback for the transmission. In other words, the Rx UE may refrain from transmitting the HARQ feedback for the transmission.

Rx UE may determine that the decoding result does not correspond to the interpretation result, or determines a mismatch or an incorrect correspondence between the decoding result and the interpretation result. If Rx UE determines, based on at least one interpretation rule, that the Tx UE will interpret the detected absence of HARQ feedback incorrectly 530, Rx UE determines to transmit 532 the HARQ feedback for the transmission.

When the Rx UE determines that the Tx UE will correctly interpret a detected absence of HARQ feedback, the Rx UE is allowed to save power and resources by not transmitting the HARQ feedback. Other UEs may then access the channel more freely. Other UEs may obtain the COT or utilize a shared COT.

Figure 6:
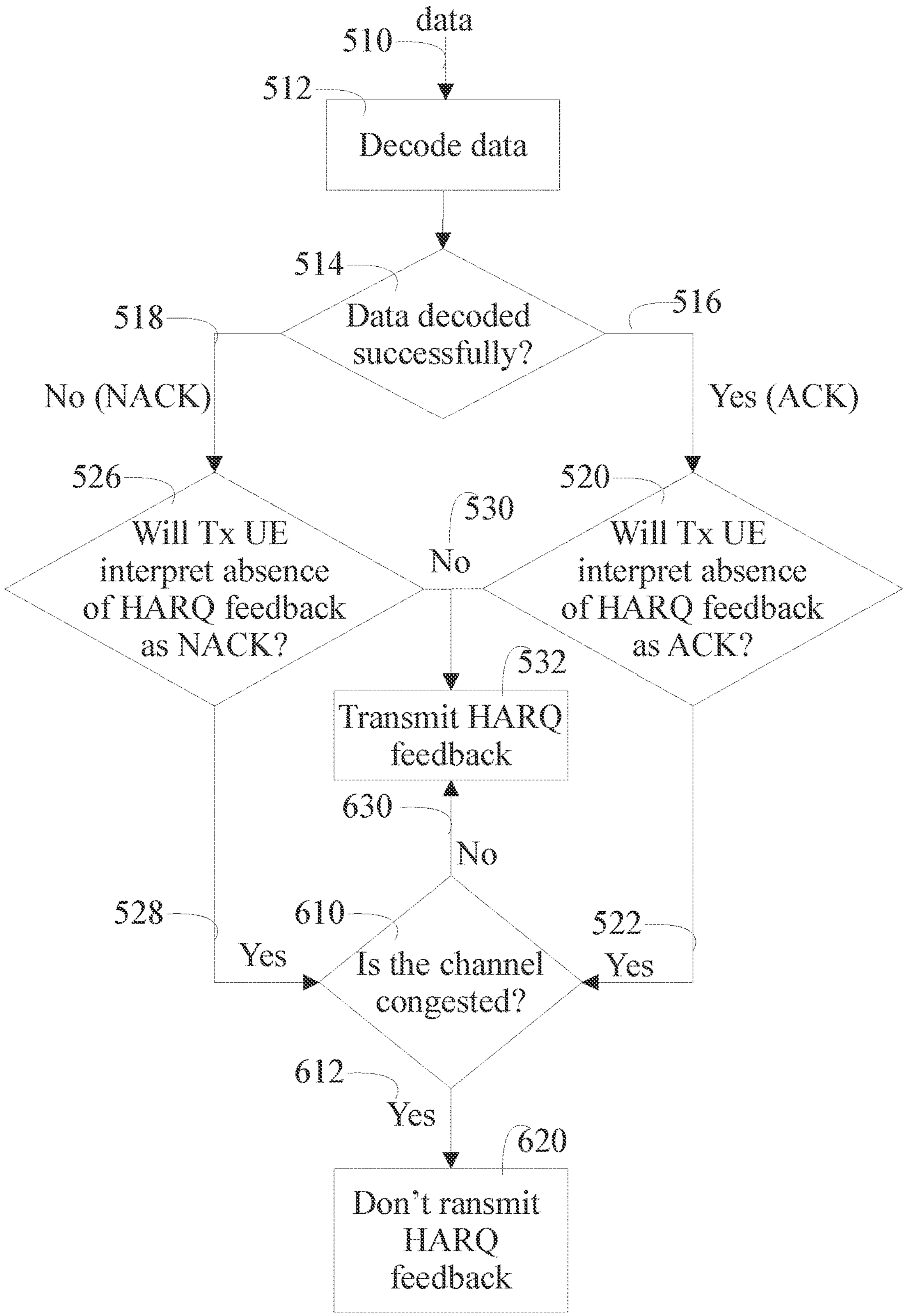
FIG. 6 shows, by way of example, a flowchart of a method.

FIG. 6 shows, by way of example, a flowchart of a method. As an addition to the example of FIG. 5, the Rx UE may take channel condition of a channel for transmitting the HARQ feedback into account when determining whether to send the HARQ feedback. The channel condition may refer to channel congestion or other quality metric of the channel, such as RSRP, RSRQ, CQI, pathloss, channel load, and/or channel occupancy. Parameters and thresholds for determining channel condition may be configured or preconfigured. Channel condition above a threshold may be determined as good channel condition. Channel condition below a threshold may be determined as bad channel condition. For example, if the channel is congested, the channel condition is below a threshold. If the channel is not congested, the channel condition is above a threshold.

After determining that the Tx UE will correctly interpret 522, **528*a* detected absence of HARQ feedback, Rx UE may determine channel condition. Rx UE may determine 610** whether the channel is congested, for example. Congestion of the channel may be determined, for example, based on a channel busy ratio (CBR) or channel occupancy ratio. Parameters and thresholds for determining channel congestion may be configured or preconfigured.

If the channel is congested 612, the Tx UE may determine 620 not to transmit the HARQ feedback. Thus, the channel is not occupied by HARQ feedback and other devices may access the channel more freely.

If the channel is not congested 630, the Tx UE may determine to transmit 532 the HARQ feedback, despite of determining that the Tx UE will correctly interpret a detected absence of HARQ feedback.

Figure 7:
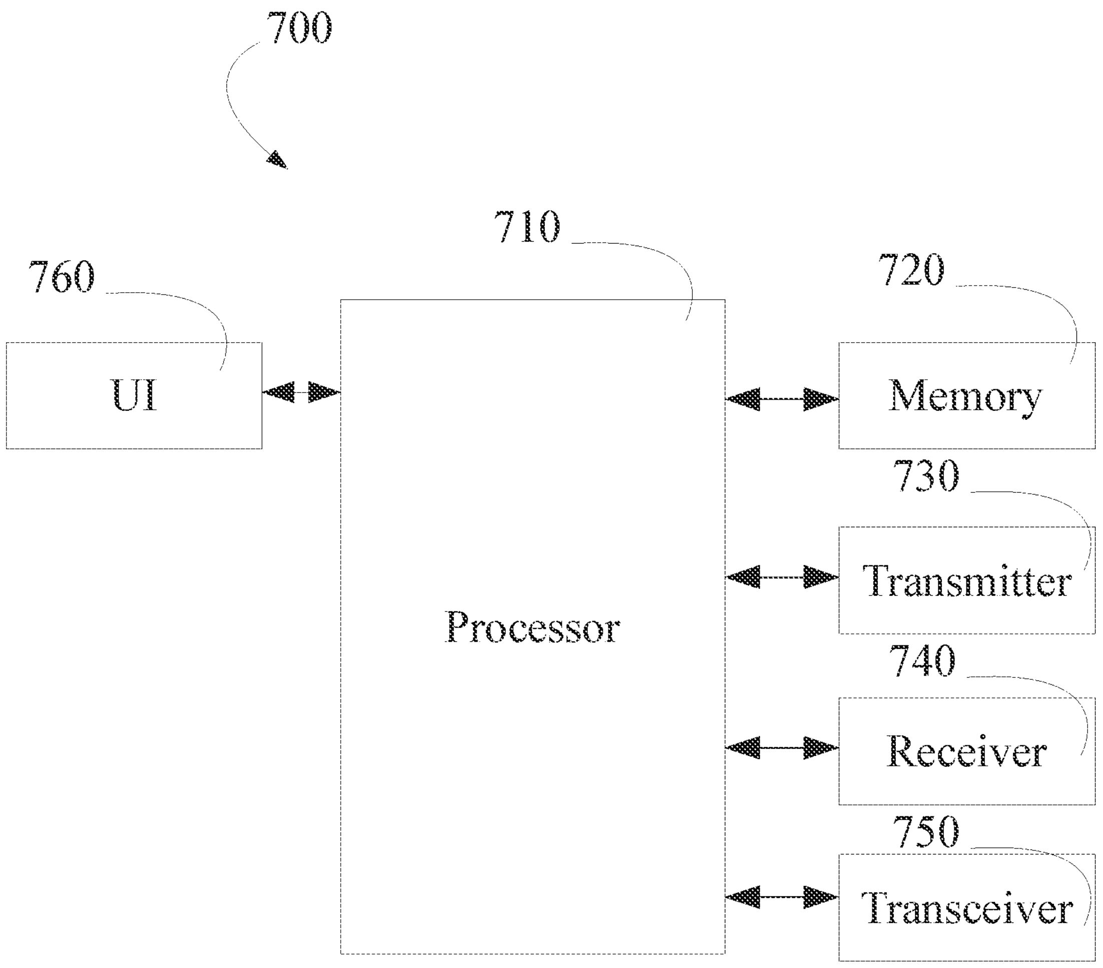
FIG. 7 shows, by way of example, a block diagram of an apparatus.

FIG. 7 shows, by way of example, a block diagram of an apparatus capable of performing at least the method as disclosed herein. Illustrated is device 700, which may comprise, for example, a mobile communication device such as a user equipment 310, 320 of FIG. 3. Comprised in device 700 is processor 710, which may comprise, for example, a single- or multi-core processor wherein a single-core processor comprises one processing core and a multi-core processor comprises more than one processing core. Processor 710 may comprise, in general, a control device. Processor 710 may comprise more than one processor. Processor 710 may be a control device. Processor 710 may comprise at least one application-specific integrated circuit, ASIC. Processor 710 may comprise at least one field-programmable gate array, FPGA. Processor 710 may be means for performing method steps in device 700. Processor 710 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a user equipment, to perform various functions) and (c) hardware circuit(s) and or processor(s), such as a microprocessor (s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 700 may comprise memory 720. Memory 720 may comprise random-access memory and/or permanent memory. Memory 720 may comprise at least one RAM chip. Memory 720 may comprise solid-state, magnetic, optical and/or holographic memory, for example. Memory 720 may be at least in part accessible to processor 710. Memory 720 may be at least in part comprised in processor 710. Memory 720 may be means for storing information. Memory 720 may comprise instructions, such as computer instructions or computer program code, that processor 710 is configured to execute. When instructions configured to cause processor 710 to perform certain actions are stored in memory 720, and device 700 overall is configured to run under the direction of processor 710 using instructions from memory 720, processor 710 and/or its at least one processing core may be considered to be configured to perform said certain actions. Memory 720 may be at least in part external to device 700 but accessible to device 700.

Device 700 may comprise a transmitter 730. Device 700 may comprise a receiver 740. Transmitter 730 and receiver 740 may be configured to transmit and receive, respectively, information in accordance with at least one cellular or non-cellular standard. Transmitter 730 may comprise more than one transmitter. Receiver 740 may comprise more than one receiver. Transmitter 730 and/or receiver 740 may be configured to operate in accordance with global system for mobile communication, GSM, wideband code division multiple access, WCDMA, 7G, long term evolution, LTE, IS-97, wireless local area network, WLAN, Ethernet and/or worldwide interoperability for microwave access, WiMAX, standards, for example.

Device 700 may comprise a near-field communication, NFC, transceiver 750. NFC transceiver 750 may support at least one NFC technology, such as NFC, Bluetooth, Wibree or similar technologies.

Device 700 may comprise user interface, UI, 760. UI 760 may comprise at least one of a display, a keyboard, a touchscreen, a vibrator arranged to signal to a user by causing device 700 to vibrate, a speaker and a microphone. A user may be able to operate device 700 via UI 760, for example to accept incoming telephone calls, to originate telephone calls or video calls, to browse the Internet, to manage digital files stored in memory 720 or on a cloud accessible via transmitter 730 and receiver 740, or via NFC transceiver 750, and/or to play games.

Processor 710 may be furnished with a transmitter arranged to output information from processor 710, via electrical leads internal to device 700, to other devices comprised in device 700. Such a transmitter may comprise a serial bus transmitter arranged to, for example, output information via at least one electrical lead to memory 720 for storage therein. Alternatively to a serial bus, the transmitter may comprise a parallel bus transmitter. Likewise processor 710 may comprise a receiver arranged to receive information in processor 710, via electrical leads internal to device 700, from other devices comprised in device 700. Such a receiver may comprise a serial bus receiver arranged to, for example, receive information via at least one electrical lead from receiver 740 for processing in processor 710. Alternatively to a serial bus, the receiver may comprise a parallel bus receiver.

Processor 710, memory 720, transmitter 730, receiver 740, NFC transceiver 750 and/or UI 760 may be interconnected by electrical leads internal to device 700 in a multitude of different ways. For example, each of the aforementioned devices may be separately connected to a master bus internal to device 700, to allow for the devices to exchange information. However, as the skilled person will appreciate, this is only one example and depending on the embodiment various ways of interconnecting at least two of the aforementioned devices may be selected.

The term "non-transitory" as used herein, is a limitation of the medium itself (i.e., tangible, not a signal) as opposed to a limitation on data storage persistency (e.g., RAM vs. ROM).

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

The following embodiments shall also be considered to be disclosed:

Embodiment 1: An apparatus comprising: at least one processor; and at least one memory storing instructions that, when executed by the at least one processor, cause the apparatus at least to perform: receiving a transmission via sidelink unlicensed band from a user equipment; determining a decoding result for the transmission; determining, based on at least one interpretation rule, an interpretation result of an absence of hybrid automatic repeat request, HARQ, feedback for the transmission; and determining, based on the decoding result and the interpretation result, whether to send the HARQ feedback for the transmission.

Embodiment 2: The apparatus of embodiment 1, wherein the at least one interpretation rule is for determining the absence of HARQ feedback for the transmission either as a positive acknowledgement, ACK, for the transmission or as a negative acknowledgement, NACK, for the transmission.

Embodiment 3: The apparatus of embodiment 1 or 2, wherein the determining, based on the decoding result and the interpretation result, whether to send the HARQ feedback for the transmission comprises: based on determining that the decoding result corresponds to the interpretation result, refraining from transmitting the HARQ feedback for the transmission.

Embodiment 4: The apparatus of embodiment 1, wherein the determining, based on the decoding result and the interpretation result, whether to send the HARQ feedback for the transmission comprises: determining that the decoding result corresponds to the interpretation result; and determining a channel condition of a channel for transmitting the HARQ feedback; based on determining that the decoding result corresponds to the interpretation result and that the channel condition is above a threshold, transmitting the HARQ feedback for the transmission; or based on determining that the decoding result corresponds to the interpretation result and that the channel condition is below a threshold, refraining from transmitting the HARQ feedback for the transmission.

Embodiment 5: The apparatus of embodiment 1, wherein the determining, based on the decoding result and the interpretation result, whether to send the HARQ feedback for the transmission comprises: based on determining that the decoding result does not correspond to the interpretation result, transmitting the HARQ feedback for the transmission.

Embodiment 6: The apparatus of any preceding embodiment, wherein the at least one interpretation rule is based on at least one of: at least one service-related parameter; or at least one channel-related parameter.

Embodiment 7: The apparatus of embodiment 6, wherein the at least one service-related parameter comprises at least one of: —quality of service; —PC5 quality of service indicator; —channel access priority class; —reliability; or —latency.

Embodiment 8: The apparatus of embodiment 6 or 7, wherein the at least one channel-related parameter comprises at least one of: —reference signal received power; —reference signal received quality; —channel quality indicator; —pathloss; —channel load; or —channel occupancy.

Embodiment 9: The apparatus of any preceding embodiment, wherein the at least one interpretation rule is preconfigured or configured.

Embodiment 10: The apparatus of embodiment 9, caused to perform: receiving, from a network node or the user equipment, a configuration indicative of the at least one interpretation rule for determining the absence of HARQ feedback for the transmission either as a positive acknowledgement, ACK, for the transmission or as a negative acknowledgement, NACK, for the transmission.

Embodiment 11: The apparatus of any preceding embodiment, caused to perform: transmitting assistance information to the user equipment or to a network node for determining a configuration for the at least one interpretation rule.

Embodiment 12: The apparatus of embodiment 11, wherein the assistance information comprises at least one of: —a mapping between at least one transmission characteristic of the transmission and either ACK or NACK; —HARQ feedback history information of the apparatus; or —listen before talk, LBT, history information of the apparatus.

Embodiment 13: The apparatus of any preceding embodiment, wherein the at least one interpretation rule is based on a mapping between at least one transmission characteristic of the transmission and either a positive acknowledgement, ACK, or a negative acknowledgement, NACK.

Embodiment 14: The apparatus of embodiment 13, wherein the at least one transmission characteristic is at least one of: —quality of service; —PC5 quality of service indicator; —channel access priority class; —reliability; —latency; —reference signal received power; —reference signal received quality; —channel quality indicator; —pathloss; —channel load; or —channel occupancy.

Embodiment 15: A method, comprising: receiving, by a user equipment, a transmission via sidelink unlicensed band from another user equipment; determining a decoding result for the transmission; determining, based on at least one interpretation rule, an interpretation result of an absence of hybrid automatic repeat request, HARQ, feedback for the transmission; and determining, based on the decoding result and the interpretation result, whether to send the HARQ feedback for the transmission.

The method may be performed by a user equipment, e.g. Rx UE. The another user equipment may be a Tx UE.

Embodiment 16: The method of embodiment 15, wherein the at least one interpretation rule is for determining the absence of HARQ feedback for the transmission either as a positive acknowledgement, ACK, for the transmission or as a negative acknowledgement, NACK, for the transmission.

Embodiment 17: The method of embodiment 15 or 16, wherein the determining, based on the decoding result and the interpretation result, whether to send the HARQ feedback for the transmission comprises: based on determining that the decoding result corresponds to the interpretation result, refraining from transmitting the HARQ feedback for the transmission.

Embodiment 18: The method of embodiment 15, wherein the determining, based on the decoding result and the interpretation result, whether to send the HARQ feedback for the transmission comprises: determining that the decoding result corresponds to the interpretation result; and determining a channel condition of a channel for transmitting the HARQ feedback; based on determining that the decoding result corresponds to the interpretation result and that the channel condition is above a threshold, transmitting the HARQ feedback for the transmission; or based on determining that the decoding result corresponds to the interpretation result and that the channel condition is below a threshold, refraining from transmitting the HARQ feedback for the transmission.

Embodiment 19: The method of embodiment 15, wherein the determining, based on the decoding result and the interpretation result, whether to send the HARQ feedback for the transmission comprises: based on determining that the decoding result does not correspond to the interpretation result, transmitting the HARQ feedback for the transmission.

Embodiment 20: The method of any of the embodiments 15 to 19, wherein the at least one interpretation rule is based on at least one of: at least one service-related parameter; or at least one channel-related parameter.

Embodiment 21: The method of embodiment 20, wherein the at least one service-related parameter comprises at least one of: —quality of service; —PC5 quality of service indicator; —channel access priority class; —reliability; or —latency.

Embodiment 22: The method of embodiment 20 or 21, wherein the at least one channel-related parameter comprises at least one of: —reference signal received power; —reference signal received quality; —channel quality indicator; —pathloss; —channel load; or —channel occupancy.

Embodiment 23: The method of any of the embodiments 15 to 22, wherein the at least one interpretation rule is preconfigured or configured.

Embodiment 24: The method of embodiment 23, comprising: receiving, from a network node or the user equipment, a configuration indicative of the at least one interpretation rule for determining the absence of HARQ feedback for the transmission either as a positive acknowledgement, ACK, for the transmission or as a negative acknowledgement, NACK, for the transmission.

Embodiment 25: The method of any of the embodiments 15 to 24, comprising: transmitting assistance information to the user equipment or to a network node for determining a configuration for the at least one interpretation rule.

Embodiment 26: The method of embodiment 25, wherein the assistance information comprises at least one of: —a mapping between at least one transmission characteristic of the transmission and either ACK or NACK; —HARQ feedback history information of the user equipment; or —listen before talk, LBT, history information of the user equipment.

Embodiment 27: The method of any of the embodiments 15 to 26, wherein the at least one interpretation rule is based on a mapping between at least one transmission characteristic of the transmission and either a positive acknowledgement, ACK, or a negative acknowledgement, NACK.

Embodiment 28: The method of embodiment 27, wherein the at least one transmission characteristic is at least one of: —quality of service; —PC5 quality of service indicator; —channel access priority class; —reliability; —latency; —reference signal received power; —reference signal received quality; —channel quality indicator; —pathloss; —channel load; or —channel occupancy.

Embodiment 29: A computer program comprising instructions, which, when executed by an apparatus, cause the apparatus to perform: receiving a transmission via sidelink unlicensed band from a user equipment; determining a decoding result for the transmission; determining, based on at least one interpretation rule, an interpretation result of an absence of hybrid automatic repeat request, HARQ, feedback for the transmission; and determining, based on the decoding result and the interpretation result, whether to send the HARQ feedback for the transmission.

Embodiment 30: The computer program of embodiment 29, comprising instructions, which, when executed by the apparatus, cause the apparatus to perform at least the method of any of the embodiments 15 to 28.

Embodiment 31: A (non-transitory) computer readable medium comprising instructions that, when executed by an apparatus, cause the apparatus to perform at least: receiving a transmission via sidelink unlicensed band from a user equipment; determining a decoding result for the transmission; determining, based on at least one interpretation rule, an interpretation result of an absence of hybrid automatic repeat request, HARQ, feedback for the transmission; and determining, based on the decoding result and the interpretation result, whether to send the HARQ feedback for the transmission.

Embodiment 32: The computer readable readable medium of embodiment 31, comprising instructions that, when executed by the apparatus, cause the apparatus to perform at least: the method of any of the embodiments 15 to 28.

Embodiment 33: An apparatus, comprising means for performing the method of any of the embodiments 15 to 28.

Embodiment 34: The apparatus of embodiment 33, wherein the means comprises at least one processor; and at least one memory storing instructions that, when executed by the at least one processor, cause the performance of the apparatus.

The apparatus in embodiments 29 to 34 may be a user equipment, e.g. Rx UE.

The invention claimed is:

1. A user equipment comprising:
at least one processor; and
at least one memory storing instructions which, when executed by the at least one processor, cause the user equipment at least to perform:
detecting absence of a hybrid automatic repeat request (HARQ) feedback for a transmission;
determining that the transmission is associated with a sidelink unlicensed band;
determining a plurality of transmission characteristics of the transmission, the plurality of transmission characteristics comprising all of:
quality of service,
PC5 quality of service indicator,
channel access priority class,
reliability,
latency,
reference signal received power,
reference signal received quality,
channel quality indicator,
pathloss,
channel load, and
channel occupancy;
providing, to at least one other user equipment, assistance information for determining a configuration for a plurality of interpretation rules, wherein the assistance information comprises all of:
a mapping between the plurality of transmission characteristics of the transmission and either a positive acknowledgement (ACK) or a negative acknowledgement (NACK),
HARQ feedback history information of the least one other user equipment, and
listen before talk (LBT) history information of the at least one other user equipment,
obtaining the configuration for the plurality of interpretation rules from the at least one other user equipment, wherein the plurality of interpretation rules is based on a plurality of service-related parameters and a plurality of channel-related parameters, wherein:
the plurality of service-related parameters comprises all of:
quality of service,
PC5 quality of service indicator,
channel access priority class,
reliability, and
latency, and
the plurality of channel-related parameters comprises all of:
reference signal received power,
reference signal received quality,
channel quality indicator,
pathloss,
channel load, and
channel occupancy;

based at least on the determining that the transmission is associated with the sidelink unlicensed band, using the plurality of interpretation rules in determining the detected absence of the HARQ feedback for the transmission either as ACK for the transmission or as the NACK for the transmission; and in case of determining the detected absence of the HARQ feedback as the NACK, retransmitting the transmission.

* * * * *